United States Patent [19]

Volkert et al.

[11] Patent Number: 5,585,409
[45] Date of Patent: Dec. 17, 1996

[54] PRODUCTION OF MOLDINGS CONTAINING ESTER AND URETHANE GROUPS, ISOCYANATE SEMIPREPOLYMERS CONTAINING ESTER GROUPS FOR THIS PURPOSE AND THEIR USE

[75] Inventors: Otto Volkert, Weisenheim; Peter Brandt, Ludwigshafen; Harald Fuchs, Kühbach, all of Germany

[73] Assignee: BASF Aktiengesellschaft, Germany

[21] Appl. No.: 653,527

[22] Filed: May 24, 1996

[30] Foreign Application Priority Data

May 26, 1995 [DE] Germany ............... 195 19 335.0

[51] Int. Cl.$^6$ ............... C08J 9/34; C08G 18/10; C08G 18/34
[52] U.S. Cl. ............... 521/51; 521/159; 521/172; 560/26; 560/359; 560/360
[58] Field of Search ............... 521/172, 51, 159; 560/26, 359, 360

[56] References Cited

U.S. PATENT DOCUMENTS

| | | | |
|---|---|---|---|
| 5,262,448 | 11/1993 | Ruckes et al. | 521/51 |
| 5,342,856 | 8/1994 | Weber | 521/51 |
| 5,389,693 | 2/1995 | DeGenova et al. | 521/51 |

*Primary Examiner*—Morton Foelak
*Attorney, Agent, or Firm*—Mary E. Golota

[57] ABSTRACT

A process for producing moldings containing ester and urethane groups and having a cellular core and a compacted surface zone, preferably shoe soles, comprises reacting a) isocyanate semiprepolymers containing ester groups and having an isocyanate content of from 10 to 26% by weight, which in turn are prepared by reacting
  ai) 4,4'-MDI or mixtures of 4,4'-MDI and modified or unmodified MDI isomers,
 with
  aii) difunctional to trifunctional polyester polyols having molecular weights of from 600 to 3000 and
  aiii) at least one branched-chain dihydroxy compound containing at least one bonded ester unit as bridge and having a molecular weight of up to 500, with b) at least one relatively high molecular weight polyhydroxyl compound and, if desired,
c) low molecular weight chain extenders and/or crosslinkers in the presence of
d) blowing agents,
e) catalysts and, if desired, f) additives in a closed mold with compaction. The isocyanate semiprepolymers containing ester groups which can be used in this process are liquid at room temperature.

7 Claims, No Drawings

PRODUCTION OF MOLDINGS CONTAINING ESTER AND URETHANE GROUPS, ISOCYANATE SEMIPREPOLYMERS CONTAINING ESTER GROUPS FOR THIS PURPOSE AND THEIR USE

The invention relates to a process for producing moldings containing ester and urethane groups and having a cellular core and a compacted surface zone, known as polyurethane (PU) integral foams, by reacting isocyanate semiprepolymers containing ester groups (a) with relatively high molecular weight polyhydroxyl compounds (b), preferably polyester polyols, and, if desired, low molecular weight chain extenders and/or crosslinkers (c) in the presence of blowing agents (d), preferably water, catalysts (e) and, if desired, additives (f) in a closed mold, using isocyanate semiprepolymers according to the invention, which are liquid at room temperature, contain ester groups and have an isocyanate content of from 10 to 26% by weight, which semiprepolymers are prepared by reacting ai) diphenylmethane 4,4'-diisocyanate, also abbreviated to MDI, or mixtures of 4,4'-MDI and modified or unmodified MDI isomers with aii) difunctional to trifunctional polyester polyols having molecular weights of from 600 to 3000 and aiii) at least one branched-chain dihydroxy compound containing at least one bonded ester unit as bridge and having a molecular weight of up to 500.

The invention also relates to the use of the moldings produced as shoe soles and the novel, eg. usable according to the invention, isocyanate semiprepolymers which are liquid at room temperature and contain ester groups.

The production of moldings having a cellular core and a compacted surface zone by reacting organic polyisocyanates, relatively high molecular weight compounds having at least two reactive hydrogens and, if desired, chain extenders in the presence of blowing agents, preferably physically acting blowing agents, catalysts, auxiliaries and/or additives in a closed, heated or unheated mold with compaction has been known for a long time and is described, for example, in DE-A-16 94 138 (GB-A-1 209 243), DE-A-19 55 891 (GB-A-1 321 679) and DE-A-17 69 886 (U.S. Pat. No. 3,824,199).

Also known is the production of sole material by the polyisocyanate polyaddition process and the use of shoe soles containing urethane groups in the shoe industry. Significant application areas for polyisocyanate polyaddition products in the shoe industry are the direct foaming on of soles and the production of ready-made polyurethane (PU) soles. Such PU shoe soles can be produced by the low-pressure or high-pressure technique (RIM) (Schuh-Technik+abc, Oct. 10, 1980, pages 822 ff).

A summary overview of polyurethane integral foams has been published, for example, in Integralschaumstoffe by Dr. H. Piechota and Dr. H. Röhr, Carl-Hanser-Verlag, Munich, Vienna, 1975 and in Kunststoff-Handbuch, volume 7, Polyurethane by Dr. G. Oertel, Carl-Hanser-Verlag, Munich, Vienna, 2nd. edition, 1983, pages 333 ff, which also gives information about the use of integral foams in the shoe industry (pages 362 to 366).

4,4'-MDI and 2,4'-MDI have melting points of 39.5° C. and 34.5° C. respectively and are therefore usually solid at room temperature and can be processed only with difficulty. There have therefore been many attempts to prepare polyisocyanate compositions which are based on MDI and are liquid at room temperature by modification of 4,4'- and/or 2,4'-MDI. For this purpose, 4,4'- and/or 2,4'-MDI are customarily reacted with substoichiometric amounts of alkylene glycols, dialkylene glycols, low molecular weight and/or relatively high molecular weight difunctional and/or trifunctional polyoxyalkylene polyols to give isocyanate semiprepolymers which are liquid at room temperature.

For example, according to DE-C-16 18 380 (U.S. Pat. No. 3,644,457), an MDI preparation which is liquid at room temperature is prepared by reacting 1 mol of 4,4'- and/or 2,4'-MDI with from 0.1 to 0.3 mol of tri-1,2-propylene ether glycol and/or poly-1,2-propylene ether glycol having a molecular weight of up to 700. 4,4'-MDI partially reacted with dipropylene glycol or partially reacted mixtures of MDI isomers and polyphenyl-polymethylene polyisocyanates, known as raw MDI, are used according to EP-B-0 364 854 (CA-A-2 000 019) for producing moldings having a compacted surface zone and a cellular core, known as integral foams, preferably shoe soles.

Liquid polyisocyanate mixtures based on MDI, containing bonded urethane groups and having an isocyanate content of from 22 to 30% by weight can, according to EP-A-0 557 792 (U.S. Pat. No. 5,374,667), be obtained, inter alia, by partial reaction of raw MDI with a polyoxypropylene-polyoxyethylene polyol having a functionality of from 2.5 to 3.5, a hydroxyl number of from 50 to 90 and a polymerized ethylene oxide group content of from more than 30 to less than 50% by weight, based on the weight of polymerized ethylene oxide and 1,2-propylene oxide groups. The isocyanate semiprepolymers are preferably used for producing CFC-free PU (molded) flexible foams.

Polyester polyurethanes can be prepared in a similar manner by reacting MDI and/or raw MDI with polyester polyols to give isocyanate semiprepolymers and these can be used for producing moldings.

According to U.S. Pat. No. 4,857,561, for example MDI and/or polyphenyl-polymethylene polyisocyanates are reacted with a polyneopentyl glycol adipate having a molecular weight of from 750 to 3500 and a functionality of from 2 to 3 to give an isocyanate semiprepolymer having an isocyanate content of from 14 to 28% by weight and this is used to produce a molding by the RIM process in a closed mold. According to CA-A-1 096 181, polyadipates based on tripropylene glycol, butanediol and ethylene glycol are used in place of neopentyl glycol for modifying 4,4'-MDI. According to DE-A-3 831 681 (U.S. Pat. No. 5,053,528), dihydroxy compounds containing bonded ester groups and having the formula

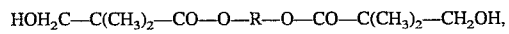

HOH$_2$C—C(CH$_3$)$_2$—CO—O—R—O—CO—C(CH$_3$)$_2$—CH$_2$OH, where R is a branched or unbranched alkylene radical or a polyoxyalkylene radical, are reacted with 4,4'- and 2,4'-MDI or mixtures of 4,4'-MDI, 2,4'-MDI and raw MDI to give isocyanate semiprepolymers. The use of ester diols or polyester diols having methyl side groups enabled the storage stability of the isocyanate semiprepolymers to be improved. However, obviously because of the high content of branched diols in the isocyanate semiprepolymers, the mechanical properties of the PU integral foams produced therefrom were adversely affected.

U.S. Pat. No. 4,182,898 describes storage-stable isocyanate prepolymers which are liquid at room temperature and are prepared by reacting diisocyanates such as HDI, JPDI, TDI and MDI with mixtures of compatible polyether and polyester polyols in a ratio of 15 to 85:85 to 15% by weight and in a ratio of NCO:OH groups of from 1.5:1 to 2:1.

According to U.S. Pat. No. 4,647,596, microcellular PU elastomers are produced from an isocyanate prepolymer whose polyol component comprises a polyester-polyether polyol from polyoxytetramethylene glycol and ε-caprolactone in a weight ratio of from 20:80 to 80:20 and having a molecular weight of from 1000 to 3000 and a polyester polyol based on adipic acid and having a molecular weight of from 1000 to 3000 and whose isocyanate component is 4,4'-MDI. PU integral foams produced using water as blowing agent are, according to U.S. Pat. No. 5,166,183, obtained by reacting an isocyanate prepolymer having an isocyanate content of from 16 to 25% by weight, prepared from MDI and a polyester diol having a molecular weight of from 1000 to 3000 and mixed, if desired, with an isocyanate prepolymer based on MDI and polyoxypropylene glycol having a molecular weight of from 134 to 700 and a specific mixture of relatively high molecular weight polyether diols, polyether polyols, 1,4-butanediol and ethylene glycol. U.S. Pat. No. 4,986,929 describes polyisocyanate mixtures having an isocyanate content of from 16 to 25% by weight and consisting essentially of an isocyanate prepolymer from MDI and a polyoxypropylene glycol having a molecular weight of from 134 to 700 and an isocyanate prepolymer prepared by reacting a mixture of MDI and MDI containing carbodiimide groups with a polyester diol having a molecular weight of from 1000 to 3000. A disadvantage of the isocyanate prepolymers described is the formation of flaws at the surface of PU integral foams produced therefrom, which flaws can be caused by insufficient compatibility of polyether and polyester isocyanate prepolymers.

It is an object of the present invention to produce moldings containing ester and urethane groups, having a cellular core and a compacted surface zone and having mechanical properties which are at least equally good, but advantageously improved, using isocyanate semiprepolymers which are liquid at room temperature, are based on a polyester polyol and have improved storage stability, even at about 0° C.

We have found that this object is achieved by using new isocyanate semiprepolymers which contain ester groups and are liquid at room temperature for producing the PU-ester integral foams.

The invention accordingly provides a process for producing moldings containing ester and urethane groups and having a cellular core and a compacted surface zone by reacting a) isocyanate semiprepolymers containing ester groups with b) at least one relatively high molecular weight polyhydroxyl compound and, if desired, c) low molecular weight chain extenders, crosslinkers or mixtures of chain extenders and crosslinkers in the presence of d) blowing agents, e) catalysts and in the presence or absence of f) additives in a closed mold with compaction, wherein the isocyanate semiprepolymers (a) used are reaction products having an isocyanate content of from 10 to 26% by weight prepared from ai) 4,4'-MDI or mixtures of 4,4'-MDI and modified or unmodified MDI isomers, aii) at least one polyester polyol having a functionality of from 2 to 3 and a molecular weight of from 600 to 3000 and aiii) at least one branched-chain dihydroxy compound containing at least one bonded ester unit as bridge and having a molecular weight of up to 500.

The invention also provides isocyanate semiprepolymers which contain ester groups, are liquid at room temperature and have an isocyanate content of from 10 to 26% by weight, which semiprepolymers are prepared by reacting ai) 4,4'-MDI or mixtures of 4,4'-MDI and modified or unmodified MDI isomers with aii) at least one polyester polyol having a functionality of from 2 to 3 and a molecular weight of from 600 to 3000 and aiii) at least one dihydroxy compound containing at least one bonded ester unit as bridge and lateral alkyl groups and having a molecular weight of up to 500.

For the purposes of the present invention, isocyanate semiprepolymers which contain ester groups and are liquid at room temperature are reaction products prepared from (ai) to (aiii) which have a viscosity at 45° C. of from 200 to 2500 mPas measured using a rotation viscometer in accordance with DIN 53018 and can be processed in liquid form above 10° C.

The novel isocyanate semiprepolymers having an isocyanate content of from 10 to 26% by weight, preferably from 15 to 22% by weight, are also storage stable at 15° C. for at least one month, preferably more than 3 months, ie. they form no crystalline sediments during this time.

Despite the preferred use of water as blowing agent, the moldings containing ester and urethane groups and produced by the process of the invention have a pronounced surface zone of higher density with an essentially smooth external skin. The Shore A hardness of the surface zone corresponds, like the other mechanical properties, to the PU integral foam moldings foamed using CFCs. Furthermore, the system components have very good flowability and can be processed without difficulty by conventional methods, eg. by the RIM or low-pressure technique, to give moldings, preferably shoe soles.

a)

The following may be specifically said about the preparation of the novel isocyanate semiprepolymers (a) which contain ester groups, are liquid at room temperature and have an isocyanate content of from 10 to 26% by weight, preferably from 15 to 22% by weight, and about the formative components (b) to (f) which can be used for the process of the invention for producing the moldings containing ester and urethane groups:

ai)

The polyisocyanate (ai) used for preparing the isocyanate semiprepolymers (a) is in particular 4,4'-MDI. Mixtures of 4,4'- and 2,4'-MDI, advantageously those having a 4,4'-MDI content of at least 40% by weight, preferably at least 80% by weight, have also been found to be very useful, so that such mixtures are also preferred. However, other suitable mixtures are those of 4,4'-MDI, 2,4'-MDI and 4,4'- and 2,4'-MDI in which the isocyanate groups have been reacted at least partially in a previous reaction stage to give carbodiimide groups, urethane groups and/or urethanimine groups.

aii)

The polyester polyols (aii) which are suitable according to the invention as modifiers advantageously have a functionality of from 2 to 3, preferably from 2.0 to 2.5, and a molecular weight of from 600 to 3000, preferably from 1000 to 3000 and in particular from 1200 to 2400. The molecular weights specified in the patent description for the polyhydroxyl compounds were calculated according to the formula $$\text{molecular weight} = \frac{56100 \times \text{functionality}}{\text{hydroxyl number}}$$

where the hydroxyl number was experimentally measured in a known manner.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can here be used either individually or in admixture with one another. In place of the free dicarboxylic acids, it is also possible to use the corresponding dicarboxylic acid derivatives such as dicarboxylic monoesters and/or diesters of alcohols having from 1 to 4 carbon atoms or dicarboxylic anhydrides. Preference is given to using dicarboxylic acid mixtures of succinic, glutaric and adipic acid in weight ratios of, for example, 20 to 35:35 to 50:20 to 32, and particularly adipic acid. Examples of dihydric and higher-hydric alcohols, in particular alkanediols and alkylene glycols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol, 1,6-hexanediol, glycerol or mixtures of at least two of the specified diols, in particular mixtures of 1,4-butanediol, 1,5-pentanediol and 1,6-hexanediol and/or glycerol. It is also possible to use polyester polyols from lactones, eg. ε-caprolactone or hydroxycarboxylic acids, eg. ω-hydroxycaproic acid.

To prepare the polyester polyols, the organic, preferably aliphatic, polycarboxylic acids and/or derivatives and polyhydric alcohols can be polycondensed in the absence of catalyst or preferably in the presence of esterification catalysts, advantageously in an atmosphere of inert gases, eg. nitrogen, helium, argon, etc., in the melt at from 150° to 250° C., preferably from 180° to 220° C., at atmospheric pressure or under reduced pressure to the desired acid number which is advantageously less than 10, preferably less than 2. According to a preferred embodiment, the esterification mixture is polycondensed at the abovementioned temperatures to an acid number of from 80 to 30, preferably from 40 to 30, at atmospheric pressure and subsequently under a pressure of less than 500 mbar, preferably from 50 to 150 mbar. Suitable esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene to azeotropically distill off the water of condensation.

To prepare the polyester polyols, the organic polycarboxylic acids and/or derivatives are polycondensed with polyhydric alcohols advantageously in a molar ratio of from 1:1 to 1.8, preferably from 1:1.05 to 1.2. To remove cyclic volatile byproducts, the polyester polyols can subsequently be additionally subjected to a distillation under reduced pressure, eg. by means of a thin-film evaporator. The polyester polyols can be used individually or as mixtures.

aiii) According to the invention, the polyisocyanates (ai) for preparing the isocyanate semiprepolymers (a) containing ester groups are partially reacted with polyester polyols (aii) and dihydroxy compounds (aiii) having a molecular weight of up to 500, preferably from 180 to 320, with the proviso that the dihydroxy compounds, preferably aliphatic dihydroxy compounds, contain at least one bonded ester unit, preferably one or 2 ester units, as bridge and have a branched chain. To form the branches, the dihydroxy compounds containing ester groups have at least 2, preferably from 2 to 12 and in particular from 4 to 8, lateral substituents, with preference being given to alkoxy groups and/or particularly alkyl groups having from 1 to 6 carbon atoms, preferably 1 or 2 carbon atoms, as substituents. Examples of suitable substituents which may be mentioned are the methoxy, ethoxy, isopropoxy, ethyl, n- and iso-propyl, n-butyl and, in particular, methyl groups. The dihydroxy compounds are advantageously prepared using linear or branched aliphatic hydroxycarboxylic acids having from 2 to 6, preferably from 2 to 5 carbon atoms, eg. glycolic acid, lactic acid, α-, β-, γ-hydroxybutyric acid, ω-hydroxycaproic acid and, in particular, hydroxypivalic acid. However, hydroxybenzoic acids are also suitable. Examples of diols for preparing the dihydroxy compounds (aiii) containing ester groups are dialkylene glycols, eg. diethylene and dipropylene glycol, oligomeric polyoxyalkylene glycols having molecular weights of up to 300 and based on ethylene oxide and/or 1,2-propylene oxide, eg. polyoxypropylene and polyoxyethylene-polyoxypropylene glycol, linear alkanediols having from 2 to 10 carbon atoms, preferably from 2 to 6 carbon atoms, eg. ethanediol, 1,3-propanediol, 1,4-butanediol, 1,5-pentanediol, 1,6-hexanediol, 1,8-octanediol and 1,10-decanediol; and preferably branched-chain alkanediols having from 3 to 15 carbon atoms, preferably from 3 to 10 carbon atoms, eg. 1,2-propanediol, 1,2- and 1,3-butanediol, 2-methyl-1,3-propanediol, 2,2-dimethyl-, 2-methyl-2-ethyl-, 2-ethyl-2-butyl-, 2-ethoxy-pentane-1,5-diol, 2,2-dimethylhexane-1,6-diol, 2,2,5-trimethylhexane-1,6-diol, 1,2-pentanediol, 2,5-dimethylhexane-2,5-diol and, in particular, 2,2-dimethylpropane-1,3-diol. Branched-chain dihydroxy compounds containing ester groups (aiii) which have been found to be useful are, for example, transesterification products of 2 mol of alkyl hydroxypivalates with one mole of dialkylene glycol, polyoxyalkylene glycol, linear alkanediol and preferably branched alkanediol, as are described, for example, in U.S. Pat. No. 5,053,528, whose entire disclosure is incorporated in this description by reference, esters of 2 mol of a linear hydroxycarboxylic acid and one mole of a branched alkanediol and preferably esters of one mole of a branched hydroxycarboxylic acid and one mole of a branched alkanediol. Particular preference is given to using the neopentyl glycol ester of hydroxypivalic acid.

To prepare the novel isocyanate semiprepolymers (a) containing ester groups and having an isocyanate content of from 10 to 26% by weight, the formative components can be reacted in the following amounts, based on the total weight of the semiprepolymer, at from 15° to 120° C., preferably from 45° to 90° C.:

ai) from 94 to 25% by weight, preferably from 77 to 53% by weight, of (ai), aii) from 5 to 60% by weight, preferably from 20 to 40% by weight, of (aii) and aiii) from 1 to 15% by weight, preferably from 3 to 7% by weight, of (aiii).

For this purpose, the modified or unmodified 4,4'-MDI and/or 2,4'-MDI can, if they are not already liquid at room temperature, be liquified by heating and then reacted while stirring with the polyester polyols (aii) and the branched-chain dihydroxy compounds containing ester groups (aiii) individually in succession or with a mixture of (aii) and (aiii). According to a preferred embodiment, the polyisocyanates (ai) are first reacted with at least one polyester polyol (aii) and then with at least one low molecular weight dihydroxy compound (aiii). To complete the reaction, it has been found to be advantageous to stir the reaction mixture for from 0.5 to 6 hours, preferably from 1 to 3 hours, in the abovementioned temperature range, eg. at from 45 to 90° C., and then to allow it to cool to room temperature while stirring.

To produce the CFC-free moldings containing ester and urethane groups and having a cellular core and a compacted surface zone, the novel liquid, storage-stable isocyanate semiprepolymers (a) containing ester groups are, as already indicated, allowed to foam with customary relatively high molecular weight polyhydroxyl compounds (b) and, if desired, low molecular weight chain extenders and/or crosslinkers (c) in the presence of blowing agents (d), catalysts (e) and, if desired, additives (f) in a closed mold with compaction and allowed to cure.

(b)

Suitable relatively high molecular weight polyhydroxyl compounds for this purpose advantageously have a functionality of from 2 to 4, preferably from 2 to 3, and a molecular weight of from 1200 to 7000, preferably from 1200 to 3600. Examples of suitable polyhydroxyl compounds are the polyether polyols, polyoxytetramethylene glycols, polymer-modified polyether polyols, polyether polyol dispersions, hydroxyl-containing polyesteramides and hydroxyl-containing polyacetals known per se. Polyhydroxyl compounds which have been found to be particularly useful and are therefore preferably used are hydroxyl-containing polycarbonates, advantageously those prepared from 1,6-hexanediol and/or 1,4-butanediol and diphenyl carbonate by transesterification, polyether-polyester polyols prepared by esterification of polyoxytetramethylene glycols having molecular weights of from 250 to 1600, preferably from 250 to 600, or of mixtures of the specified polyoxytetramethylene glycols and alkanediols having from 2 to 6 carbon atoms and/or dialkylene glycols having from 4 to 6 caron atoms with alkanedicarboxylic acids having from 4 to 6 carbon atoms, eg. succinic, glutaric or adipic acid or mixtures of at least 2 of the specified dicarboxylic acids, and, in particular, polyester polyols prepared from the abovementioned polycarboxylic acids and polyhydric alcohols and/or dialkylene glycols which can be used for preparing the polyester polyols (aii).

c)

The for example semirigid and preferably flexible moldings containing ester and urethane groups and having a compacted surface zone and cellular core, known as PU integral foams, can be produced by the process of the invention with or without use of chain extenders and/or crosslinkers (c). However, in the case of flexible and semi-rigid PU integral foams, the addition of chain extenders, crosslinkers or, if desired, mixtures thereof can be found to be advantageous for modifying the mechanical properties, eg. the hardness. Chain extenders and/or crosslinkers which can be used are, for example, low molecular weight, polyhydric alcohols, preferably diols and/or triols, having molecular weights of less than 400, preferably from 60 to 300. Suitable chain extenders are, for example, aliphatic, cycloaliphatic and/or araliphatic diols such as alkanediols having from 2 to 14, preferably from 2 to 6, carbon atoms and/or dialkylene glycols having from 4 to 8, preferably from 4 to 6, carbon atoms, eg. ethylene glycol, 1,3-propanediol, 1,10-decanediol, o-, m-, p-dihydroxycyclohexane, diethylene glycol, triethylene glycol, dipropylene glycol, tripropylene glycol and preferably 1,3-butanediol, 1,4-butanediol, 1,6-hexanediol and bis(2-hydroxyethyl)hydroquinone, and suitable crosslinkers are, for example, triols such as 1,2,4- or 1,3,5-trihydroxycyclohexane, trimethylolethane, glycerol and trimethylolpropane.

If compounds of the component (c) are used, these can be used in the form of mixtures or individually and are advantageously employed in amounts of from 1 to 50 parts by weight, preferably from 3 to 40 parts by weight, bsed on 100 parts by weight of the relatively high molecular weight compounds (b).

d)

The blowing agent (d) used is preferably water which reacts in situ with the isocyanate semiprepolymers (a) containing ester groups to form carbon dioxide and amino groups which in turn react further with the isocyanate semiprepolymers (a) to give urea groups and can thereby influence the compressive strength of the PU integral foam moldings. Since the formative components (b) and, if used, (c) can contain water as a result of their preparation and/or chemical composition, in some cases it is not necessary to separately add water to the formative components (b) and, if applicable, (c) or to the reaction mixture. However, if water has to be additionally incorporated into the polyurethane formulation to achieve the desired bulk density, this is usually used in amounts of from 0.05 to 4.0% by weight, preferably from 0.1 to 3.0% by weight and in particular from 0.3 to 2.5% by weight, based on the weight of the formative components (a) to (c).

As blowing agent (d) it is also possible to use, in place of water or preferably in combination with water, low-boiling liquids which vaporize under the influence of the exothermic polyaddition reaction and advantageously have a boiling point at atmospheric pressure in the range from $-40°$ to $120°$ C., preferably from $10°$ to $90°$ C., or gases.

The liquids of the abovementioned type and gases suitable as blowing agent can, for example, be selected from the group of alkanes such as propane, n- and iso-butane, n- and iso-pentane and preferably the industrial pentane mixtures, cycloalkanes and cycloalkenes such as cyclobutane, cyclopentene, cyclohexene and preferably cyclopentane and/or cyclohexane, dialkyl ethers such as dimethyl ether, methyl ethyl ether or diethyl ether, tert-butyl methyl ether, cycloalkylene ethers such as furan, ketones such as acetone, methyl ethyl ketone, acetals and/or ketals such as formaldehyde dimethyl acetal, 1,3-dioxolane and acetone dimethyl acetal, carboxylic esters such as ethyl acetate, methyl formate and ethylene-acrylic acid tert-butyl ester, tertiary alcohols such as tertiary butanol, carboxylic acids such as formic acid, acetic acid and propionic acid, fluoroalkanes which are degraded in the troposphere and therefore do not damage the ozone layer, eg. trifluoromethane, difluoromethane, difluoroethane, tetrafluoroethane and heptafluoroethane, chloroalkanes such as 2-chloropropane, and gases such as nitrogen, carbon monoxide and noble gases such as helium, neon and krypton.

Among the liquids which are inert toward NCO groups and are suitable as blowing agent (d), preference is given to using alkanes, cycloalkanes or mixtures of alkanes and cycloalkanes having a boiling point of from $-40°$ to $50°$ C. at atmospheric pressure.

Suitable blowing agents also include salts which decompose thermally, eg. ammonium bicarbonate and/or ammonium carbamate or compounds which form such salts in situ, eg. aqueous ammonia and/or amines and carbon dioxide, and ammonium salts of organic carboxylic acids, eg. the monoammonium salts of malonic acid, boric acid, formic acid or acetic acid.

The most advantageous amount of solid blowing agents, low-boiling liquids and gases which can be used either individually or in the form of mixtures, eg. as liquid or gas mixtures or as gas-liquid mixtures, depends on the density which is to be achieved and the amount of water used. The amounts required can be easily determined by simple experiments. Satisfactory results are usually given by amounts of solid of from 0.5 to 35 parts by weight, preferably from 2 to 15 parts by weight, amounts of liquid of from 1 to 30 parts by weight, preferably from 3 to 18 parts by weight, and/or amounts of gas of from 0.01 to 80 parts by weight, preferably from 10 to 35 parts by weight, in each case based on the weight of the formative components (a), (b) and, if applicable, (c). The charge with gas, eg. air, carbon dioxide, nitrogen and/or helium, can be carried out via the relatively high molecular weight compounds (b) and, if applicable, low molecular weight chain extenders and/or crosslinkers (c) or via the polyisocyanates (a) or via (a) and (b) and, if applicable, (c).

Blowing agents which are not used are, as already indicated, fully halogenated CFCs.

e)

Catalysts (e) used for producing the PU foam moldings are, in particular, compounds which strongly accelerate the reaction of the hydroxyl-containing compounds of the formative component (b) and, if used, (c) with the isocyanate semiprepolymers (a) containing ester groups. Suitable examples are organic metal compounds, eg. zinc stearate, zinc oleate and preferably organic tin compounds such as tin(II) salts of organic carboxylic acids, eg. tin(II) acetate, tin(II) octoate, tin(II) ethylhexanoate and tin(II) laurate, and the dialkyltin(IV) salts of organic carboxylic acids eg. dibutyltin diacetate, dibutyltin dilaurate, dibutyltin maleate and dioctyltin diacetate, organic amidines such as 2,3-dimethyl-3,4,5,6-tetra-hydropyrimidine, tertiary amines such as triethylamine, tributylamine, methyldicyclohexylamine, 1,4-dimethylbenzylamine, N-methylmorpholine, N-ethylmorpholine, N-cyclohexylmorpholine, dimethylaminopropylamine, N,N-bis(dimethylaminopropyl)methylamine, N,N,N',N'-tetramethylethylenediamine, N,N,N'N'-tetramethylbutane-1,4-diamine, N,N,N'N'-tetramethylhexane-1,6diamine, pentamethyldiethylenetriamine, bis(dimethylaminoethyl) ether, 2-hydroxyethyl 2'-dimethylaminoethyl ether, bis(dimethylaminopropyl)urea, dimethylpiperazine, 1,2-dimethylimidazole, 1-azabicyclo[3.3.01]octane and preferably 1,4-diazabicyclo[2.2.21]octane and alkanolamine compounds such as triethanolamine, triisopropanolamine, N-methyldiethanolamine and N-ethyldiethanolamine and dimethylethanolamine. Preference is given to using 1,4-diazabicyclo [2.2.21]octane, particularly in the form of a solution in ethylene glycol or 1,4-butanediol, dimethylaminopropylamine and also combinations of these tertiary amines with tin salts. Preference is given to using from 0.01 to 3% by weight, in particular from 0.8 to 1.4% by weight, of catalyst or catalyst combination, based on the weight of the component (b). The organic metal compounds and strongly basic amines, preferably tertiary amines, can, for example, each be used as sole catalyst or in combination with one another.

(f)

If desired, additives (f) can also be incorporated into the reaction mixture for producing the preferably flexible moldings containing ester and urethane groups and having a cellular core and a compacted surface zone. Examples which may be mentioned are surface-active substances, foam stabilizers, cell regulators, lubricants, fillers, dyes, pigments, flame retardants, internal mold release agents, hydrolysis inhibitors, fungistatic and bacteriostatic substances.

Suitable surface-active substances are, for example, compounds which serve to aid the homogenization of the starting materials and may also be suitable for regulating the cell structure. Examples which may be mentioned are emulsifiers such as the sodium salts of castor oil sulfates or of fatty acids and also salts of fatty acids with amines, eg. diethylamine oleate, diethanolamine stearate, diethanolamine ricinoleate, salts of sulfonic acids, eg. alkali metal or ammonium salts of dodecylbenzene- or dinaphthylmethanedisulfonic acid and ricinoleic acid; foam stabilizers such as siloxane-oxalkylene copolymers and other organopolysiloxanes, ethoxylated alkylphenols, ethoxylated fatty alcohols, paraffin oils, castor oil or ricinoleic esters, Turkey red oil and peanut oil and cell regulators such as paraffins, fatty alcohols and dimethylpolysiloxanes.

Oligomeric polyacrylates having polyoxyalkylene and fluoroalkane radicals as side groups are also suitable for improving the emulsifying action, the cell structure and/or stabilizing the foam. The surface-active substances are usually used in amounts of from 0.01 to 5 parts by weight, based on 100 parts by weight of the component (b).

As lubricant, the addition of a ricinoleic polyester having a molecular weight of from 1500 to 3500, preferably from 2000 to 3000, has been found to be particularly useful and this is advantageously used in an amount of from 0.5 to 10% by weight, preferably from 5 to 8% by weight, based on the weight of the component (b) or the components (b) and (c).

For the purposes of the present invention, fillers, in particular reinforcing fillers, are the customary organic and inorganic fillers and reinforcements known per se. Specific examples are: inorganic fillers such as siliceous minerals, for example sheet silicates such as antigorite, serpentine, hornblendes, amphiboles, chrysotile, talc; metal oxides such as kaolin, aluminum oxides, aluminum silicate, titanium oxides and iron oxides, metal salts such as chalk, barite and inorganic pigments such as cadmium sulfide, zinc sulfide, and also glass particles. Examples of suitable organic fillers are: carbon black, melamine, rosin, cyclopentadienyl resins and graft polymers.

The inorganic and organic fillers can be used individually or as mixtures and are advantageously incorporated into the reaction mixture in amounts of from 0.5 to 50% by weight, preferably from 1 to 40% by weight, based on the weight of the components (a) to (c).

Suitable flame retardants are, for example, tricresyl phosphate, tris(2-chloroethyl) phosphate, tris(2-chloropropyl) phosphate, tris(1,3-dichloropropyl) phosphate, tris(2,3-dibromopropyl) phosphate and tetrakis(2-chloroethyl)ethylene diphosphate.

Apart from the abovementioned halogen-substituted phosphates, it is also possible to use inorganic flame retardants such as red phosphorus, expanded graphite, hydrated aluminum oxide, antimony trioxide, arsenic oxide, ammonium polyphosphate and calcium sulfate or cyanuric acid derivatives such as melamine or mixtures of at least two flame retardants such as expanded graphite and ammonium polyphosphate, ammonium polyphosphates and melamine and also, if desired, expanded graphite and/or starch for making the moldings produced according to the invention flame resistant. In general, it has been found to be advantageous to use from 2 to 50 parts by weight, preferably from 5 to 25 parts by weight, of the specified flame retardants or mixtures per 100 parts by weight of the components (a) to (c).

Further details about the abovementioned other customary auxiliaries and additives can be found in the specialist literature, for example the monography by J. H. Saunders and K. C. Frisch "High polymers" volume XVI, Polyurethanes, parts 1 and 2, Interscience Publishers 1962 or 1964, or Kunststoff-Handbuch, Polyurethane, volume VII, Carl-Hanser-Verlag, Munich, Vienna, 1st and 2nd editions, 1966 and 1983.

To produce the moldings, the isocyanate semiprepolymers (a) containing ester groups, relatively high molecular weight polyhydroxyl compounds (b) and, if desired, low molecular weight chain extenders and/or crosslinkers (c) are usually reacted in such amounts that the equivalence ratio of NCO groups of the semiprepolymers (a) to the sum of the reactive hydrogens of the components (b) and, if applicable, (c) is from 0.45 to 1.80:1, preferably from 0.95 to 1.15:1 and in particular from 0.9 to 1.1:1.

The novel for example semirigid or preferably flexible moldings containing ester and urethane groups can be produced by the one-shot process using the low-pressure technique or the high-pressure technique in closed, advantageously heatable molds, for example metal molds of, for example, aluminum, cast iron or steel, or molds of fiber-reinforced polyester or epoxide molding compositions. However, owing to the good flowability and improved processibility of the formulations, the moldings are produced in particular by means of reaction injection molding (RIM). These methods are described, for example, by Dr. Piechota and Dr. Röhr in "Integralschaumstoff", Carl-Hanser-Verlag, Munich, Vienna 1975; D. J. Prepelka and J. L. Wharton in Journal of Cellular Plastics, March/April 1975, pages 87 to 98, U. Knipp in Journal of Cellular Plastics, March/April 1973, pages 76 to 84 and in Kunststoff-Handbuch, volume 7, Polyurethane, 2nd edition, 1983, pages 333 ff.

It has been found to be particularly advantageous to work according to the two-component process and combine the formative components (b), (d), (e) and, if used, (c) and (f) in the component (A) and use the novel isocyanate semiprepolymers (a) containing ester groups as component (B).

The starting components are advantageously mixed at from 15° to 80° C., preferably from 25° to 55° C., and introduced, if desired under increased pressure, into the closed mold. Mixing can be carried out mechanically by means of a stirrer or a stirring spiral or under high pressure by the countercurrent injection method. The mold temperature is advantageously from 20° to 120° C., preferably from 30° to 80° C. and in particular from 45° to 60° C. The degrees of compaction are in the range from 1.4 to 8.3, preferably from 2 to 7 and in particular from 2.4 to 4.5.

The amount of reaction mixture introduced into the mold is advantageously such that the moldings obtained have a total density of from 0.06 to 0.9 g/cm³, with, for example, the semirigid moldings preferably having a total density of from 0.1 to 0.9 g/cm³, in particular from 0.35 to 0.7 g/cm³, and the flexible moldings preferably having a total density of from 0.2 to 0.7 g/cm³, preferably from 0.3 to 0.5 g/cm³.

The flexible moldings produced by the process of the invention are used, for example, as armrests, headrests and safety linings in motor vehicle interiors, as sports goods and as bicycle or motorcycle saddles. They are also suitable as steering wheels for vehicles, preferably motor vehicles, and as inner boot for ski boots, and also, in particular, as shoe soles. The semirigid moldings are suitable, for example, as dashboards and side linings in vehicles, as ski cores and for the cladding of metal containers, preferably of metal barrels for beverages, for example alcoholic or nonalcoholic beverages such as beer or fruit juices.

Examples

Preparation of the Isocyanate Semiprepolymers Containing Ester Groups

Starting materials

Polyisocyanate (ai): 4,4'-MDI

Polyester polyol (aiiI): difunctional polyester polyol having a molecular weight of 2000 and a viscosity at 75° C. of 615 mPas, measured using a rotation viscometer in accordance with DIN 53018, prepared by polycondensation of adipic acid with ethylene glycol and 1,4-butanediol in a molar ratio of 3:2:1.

Polyester polyol (aiiII): polyester polyol having a molecular weight of 2200, a functionality of 2.15 and a viscosity at 75° C. of 700 mPas, measured using a rotation viscometer in accordance with DIN 53018, prepared by polycondensation of adipic acid, ethylene glycol, diethylene glycol, 1,4-butanediol and trimethylolpropane in a molar ratio of 9.1:5:3:1:0.1.

Branched-chain dihydroxy compound (aiii) containing at least one ester unit: neopentyl glycol ester of hydroxypivalic acid having the formula

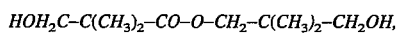

$$HOH_2C-C(CH_3)_2-CO-O-CH_2-C(CH_3)_2-CH_2OH,$$

(hereinafter abbreviated to "HPN").

General Preparative Procedure

In a three-neck flask fitted with stirrer, reflux condenser and gas inlet and outlet facilities, 4,4'-MDI was heated to 50° C. under an atmosphere of dry nitrogen and reacted while stirring with a polyester polyol (aii) and then with HPN (aiii) to produce the isocyanate semiprepolymers (a) of the invention. The heat liberated during the polyaddition reaction caused the temperature of the reaction mixture to rise to about 75° C. To complete the isocyanate semiprepolymer formation, the reaction mixture was heated to 80° C., stirred for one hour at this temperature and then allowed to cool.

The amount and type of the formative components used and the properties determined on the isocyanate semiprepolymers prepared are summarized in Table 1 below. Here, "stability(+)" means that the isocyanate semiprepolymers are a clear liquid after storage for 7 days at 15° C. and "stability(−)" means that the isocyanate semiprepolymers have crystallized under the same storage conditions.

TABLE 1

| | Isocyanate semiprepolymer prepared by reaction of | | | Properties | | |
|---|---|---|---|---|---|---|
| | | polyester polyol | | | | |
| | 4-4'-MDI [parts by weight] | Type | Amount [parts by weight] | HPN [parts by weight] | NCO content [parts by weight] | Viscosity* at ... °C. [mPa · s] | Stability 7 days/15° C. |
| Example | | | | | | | |
| 1 | 66 | aiiI | 30 | 4 | 19.3 | 410 | (+) |
| 2 | 64 | aiiI | 30 | 6 | 17.8 | 670 | (+) |
| 3 | 66 | aiiII | 30 | 4 | 19.3 | 380 | (+) |
| 4 | 64 | aiiII | 30 | 6 | 17.8 | 630 | (+) |
| 5 | 58 | aiiII | 40 | 2 | 16.9 | 690 | (+) |
| 6 | 56 | aiiII | 40 | 4 | 15.5 | 1300 | (+) |
| Comparative Example | | | | | | | |
| I | 85 | — | — | 15 | 21.5 | 200 | (−) |
| II | 70 | aiiI | 30 | — | 22.3 | 250 | (−) |
| III | 60 | aiiII | 40 | — | 18.5 | 380 | (−) |

*measured using a rotation viscometer in accordance with DIN 53018

Production of PU Integral Foams

Example 7

A component: mixture comprising 90.7 parts by weight of polyester polyol (aiiI), 7.8 parts by weight of ethylene glycol, 0.3 parts by weight of a foam stabilizer based on silicone (Tegostab® 8450, from Goldschmidt AG, Essen)

0.4 parts by weight of triethylenediamine and 0.8 parts by weight of water

B component: isocyanate semiprepolymer prepared as described in Example 2.

100 parts by weight of the A component and 99 parts by weight of the B component were intensively mixed at 23° C. 140 g of the reaction mixture were placed in an aluminum mold heated to 45° C. and having the internal dimensions 20×20×1 cm, the mold was closed and the mixture was allowed to foam and cure. This gave a PU foam plate having a pronounced, essentially compact surface zone and a cellular core. The mechanical properties measured on the PU foam plate are shown in Table 2.

Example 8

A component: as in Example 7

B component: isocyanate semiprepolymer prepared as described in

Example 3

The PU integral foam plate was produced by a method similar to Example 7, but 91 parts by weight of the B component were used for 100 parts by weight of the A component. The mechanical properties measured on the PU integral foam plate produced are shown in Table 2.

TABLE 2

| | Mechanical properties of the PU integral foam plates | |
|---|---|---|
| | Example | |
| Mechanical properties: | 7 | 8 |
| Total density [g/l] | 350 | 350 |
| Shore A hardness in accordance with DIN 53505 | 41 | 42 |
| Tensile strength in accordance with DIN 53504 [N/mm²] | 4.5 | 4.1 |
| Elongation in accordance with DIN 53504 [%] | 350 | 400 |
| Tear propagation resistance in accordance with DIN 53507 [N/mm] | 5.5 | 6.3 |
| Free-foamed density [g/l] | 191 | 185 |

Comparative Example

No PU integral foam moldings could be produced from the isocyanate semiprepolymers described in Comparative Examples I, II and III under the abovementioned reaction conditions, since these isocyanate semiprepolymers were crystalline at room temperature and therefore could not be processed by the abovedescribed method.

We claim:

1. A process for producing moldings containing ester and urethane groups and having a cellular core and a densified surface zone by reacting a) isocyanate semiprepolymers containing ester groups with b) at least one relatively high molecular weight polyhydroxyl compound and, if desired, c) low molecular weight chain extenders, crosslinkers or mixtures of chain extenders and crosslinkers in the presence of d) blowing agents, e) catalysts and in the presence or absence of f) additives in a closed mold with compaction, wherein the isocyanate semiprepolymers (a) used are reaction products having an isocyanate content of from 10 to 26% by weight prepared from
- ai) diphenylmethane 4,4'-diisocyanate or mixtures of diphenylmethane 4,4'-diisocyanate and modified or unmodified diphenylmethane diisocyanate isomers,
- aii) at least one polyester polyol having a functionality of from 2 to 3 and a molecular weight of from 600 to 3000 and
- aiii) at least one branched-chain dihydroxy compound containing at least one bonded ester unit as bridge and having a molecular weight of up to 500.

2. A process as claimed in claim 1, wherein the dihydroxy compounds (aiii) contain at least one bonded ester unit as bridge and at least one bonded lateral alkyl group having from 1 to 4 carbon atoms.

3. A process as claimed in claim 1, wherein the dihydroxy compound (aiii) is the neopentyl glycol ester of hydroxypivalic acid.

4. A process as claimed in claim 1, wherein the isocyanate semiprepolymers (a) are reaction products prepared using diphenylmethane 4,4'-diisocyanate or mixtures of diphenylmethane 4,4'- and 2,4'-diisocyanate (ai).

5. A process as claimed in claim 1, wherein the isocyanate semiprepolymers (a) containing ester groups and having an isocyanate content of from 10 to 26% by weight are reaction products prepared by reaction of, based on the total weight,
- (ai) from 94 to 25% by weight of (ai),
- (aii) from 5 to 60% by weight of (aii) and
- (aiii) from 1 to 15% by weight of (aiii).

6. A process as claimed in claim 1, wherein the polyhydroxyl compounds (b) have a functionality of from 2 to 4 and a molecular weight of from 1200 to 3600 and are selected from the group of polyester polyols, polyetherpolyester polyols and hydroxyl-containing polycarbonates.

7. A process as claimed in claim 1, wherein the blowing agent (d) is formed in situ from water and the isocyanate semiprepolymers (a).

* * * * *